United States Patent

Nishimura et al.

(10) Patent No.: US 8,992,805 B2
(45) Date of Patent: Mar. 31, 2015

(54) LIQUID CRYSTAL POLYESTER RESIN COMPOSITION, MOLDED BODY, AND LED REFLECTOR

(75) Inventors: Kiichiro Nishimura, Tokyo (JP); Lu Shi, Tokyo (JP); Satoshi Murouchi, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 14/111,004

(22) PCT Filed: Apr. 12, 2012

(86) PCT No.: PCT/JP2012/060072
§ 371 (c)(1),
(2), (4) Date: Dec. 16, 2013

(87) PCT Pub. No.: WO2012/141269
PCT Pub. Date: Oct. 18, 2012

(65) Prior Publication Data
US 2014/0110644 A1  Apr. 24, 2014

(30) Foreign Application Priority Data
Apr. 15, 2011 (JP) ............... P2011-091590

(51) Int. Cl.
*F21V 9/00* (2006.01)
*G02B 5/02* (2006.01)
*G02C 7/10* (2006.01)
*G02F 1/361* (2006.01)
*G03B 11/00* (2006.01)
*G02B 5/08* (2006.01)
*C09K 19/38* (2006.01)
*C08K 3/22* (2006.01)
*C09K 19/52* (2006.01)
*H01L 33/00* (2010.01)

(52) U.S. Cl.
CPC .............. *G02B 5/08* (2013.01); *C09K 19/3809* (2013.01); *C08K 3/22* (2013.01); *C08K 2003/2241* (2013.01)
USPC . 252/582; 252/299.01; 257/98; 257/E33.072; 428/1.1; 528/272; 528/298; 528/302; 528/307; 528/308

(58) Field of Classification Search
USPC ................ 252/299.5, 299.6, 299.64, 299.66, 252/299.01, 582; 362/296.1; 428/1, 1.1; 524/494; 528/272, 298, 302, 307, 308; 257/98, E33.072
See application file for complete search history.

(56) References Cited

U.S. PATENT DOCUMENTS 6,093,787 A * 7/2000 Long et al. ................ 528/272
2010/0053972 A1* 3/2010 Nakayama ............. 362/296.01

FOREIGN PATENT DOCUMENTS

| CN | 1265684 | 9/2000 |
|---|---|---|
| CN | 101679726 | 3/2010 |
| JP | 53-11991 | 2/1978 |
| JP | 63-156822 | 6/1988 |
| JP | 06-38520 B2 | 5/1994 |
| JP | 2002-503286 A | 1/2002 |
| JP | 2004-277539 | 7/2004 |
| JP | 2004-256673 | 9/2004 |
| JP | 2007-254669 | 4/2007 |
| JP | 2009-256627 | 5/2009 |

OTHER PUBLICATIONS

International Search Report for International Application PCT/JP2012/060072, mailed Jul. 17, 2012.
International Preliminary Report on Patentability for International Application PCT/JP2012/060072, mailed Oct. 24, 2013 with Written Opinion.
U.S. Appl. No. 14/111,035 to Kiichiro Nishimura et al., which was filed Oct. 10, 2013.

* cited by examiner

*Primary Examiner* — Bijan Ahvazi
(74) *Attorney, Agent, or Firm* — Greenblum & Bernstein, P.L.C.

(57) ABSTRACT

A liquid crystal polyester resin composition of the present invention comprises: 100 parts by mass of a liquid crystal polyester; and 50 to 150 parts by mass of titanium oxide, wherein the liquid crystal polyester comprises 2 to 30 mole % of a repeating structural unit represented by the following formula (1), and 40 to 80 mole % of a repeating structural unit represented by the following formula (2).

[Chemical Formula 1]

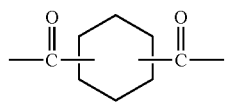

(1)

[Chemical Formula 2]

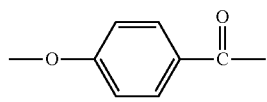

(2)

7 Claims, No Drawings

LIQUID CRYSTAL POLYESTER RESIN COMPOSITION, MOLDED BODY, AND LED REFLECTOR

TECHNICAL FIELD

The present invention relates to a liquid crystal polyester resin composition, a molded body thereof and an LED reflector thereof.

BACKGROUND ART

In recent years, the downsizing of IT equipment such as a mobile terminal has been advanced, and accordingly the downsizing and high precision of electric/electronic parts such as an LED (light-emitting diode) used for them also have been advance. Because the sizes of these precision parts are small, and the thicknesses thereof are also thin, precision molding processability with high dimensional accuracy, flowability, and advanced mechanical properties such as high rigidity are required. Because the precision parts are surface-mounted, and are attached to a substrate by solder reflow, heat resistance withstanding soldering is also required. As a material combining good molding processability, flowability, advanced mechanical properties and heat resistance, attention is directed to a liquid crystalline polyester having an adamant molecular structure and exhibiting optical anisotropy during melting to bring excellent flowability, and the use thereof for the compact precision part increases.

In an LED (light-emitting diode) light-emitting apparatus, a reflector (white reflective frame) is provided around an LED device in order to increase the light utilization rate of the LED. As molding materials for LED reflectors, various liquid crystal polyester resin compositions in which a liquid crystal polyester excellent in heat resistance and a white pigment such as titanium oxide are blended have been proposed (for example, see the following Patent Literatures 1 to 5).

CITATION LIST

Patent Literature

Patent Literature 1: Japanese Patent Publication No. 06-38520
Patent Literature 2: Japanese Patent Application Laid-Open No. 2004-256673
Patent Literature 3: Japanese Patent Application Laid-Open No. 2004-277539
Patent Literature 4: Japanese Patent Application Laid-Open No, 2007-254669
Patent Literature 5: Japanese Patent Application Laid-Open No. 2009-256627

SUMMARY OF INVENTION

Technical Problem

However, a problem of LED reflectors formed of the above conventional liquid crystal polyester resin compositions is that a reflector surface is easily discolored by the light of the LED, and thus, the light reflectance of the reflector decreases, and LED brightness decrease (decrease in light extraction efficiency) occurs.

In recent years, the power of LEDs has increased, and there has been a tendency that light energy that reflectors receive increases. Therefore, for LED reflectors formed of liquid crystal polyester resin compositions, there is a possibility that the above discoloration problem becomes serious.

The present invention has been made in view of the above circumstances, and it is an object of the present invention to provide a liquid crystal polyester resin composition capable of producing a molded body which has sufficient light reflectance and in which discoloration due to light is little and light reflectance is less likely to decrease, and the molded body and an LED reflector thereof.

Solution to Problem

In order to solve the above problem, the present inventors have studied diligently, and, as a result, found that a resin composition comprising a liquid crystal polyester containing p-hydroxybenzoic acid (HBA) in a particular amount and cyclohexane dicarboxylic acid (CHDA) in a particular amount as a constituent of a polyester, and titanium oxide in a particular amount with respect to this liquid crystal polyester, can form a molded body having sufficient light reflectance and light resistance and having sufficient heat resistance and mechanical properties, and in the molded body, a decrease in light reflectance of the molded body is smaller than that of ones formed from conventional liquid crystal polyester resin compositions even after a predetermined light irradiation test, and the present inventors have completed the present invention.

A liquid crystal polyester resin composition of the present invention comprises: 100 parts by mass of a liquid crystal polyester; and 50 to 150 parts by mass of titanium oxide, wherein the liquid crystal polyester comprises 2 to 30 mole % of a repeating structural unit represented by the following formula (1), and 40 to 80 mole % of a repeating structural unit represented by the following formula (2).

[Chemical Formula 1]

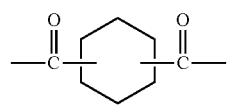
(1)

[Chemical Formula 2]

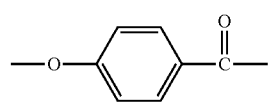
(2)

According to the liquid crystal polyester resin composition of the present invention, by having the above configuration, a molded body which has sufficient light reflectance and in which discoloration due to light is little and light reflectance is less likely to decrease can be obtained.

In terms of ensuring the strength, durability, and solder heat resistance, or the like of a molded body, a resin composition is required to have sufficiently high mechanical properties such as a flexural modulus, and a sufficiently high distortion temperature under load (DTUL), and particularly, in order to ensure heat resistance capable of withstanding solder reflow, the DTUL is preferably 220° C. or more, and the liquid crystal polyester resin composition of the present invention can have such heat resistance and mechanical properties.

The liquid crystal polyester resin composition of the present invention has high reflectance for light having a wavelength of 480 nm, discoloration is less likely to proceed also for light emitted from a white LED device, and the liquid crystal polyester resin composition of the present invention can have excellent heat resistance capable of withstanding solder reflow, and is suitable, for example, as a material for forming a reflector used for a white LED having a high power of 1 W or more.

In terms of light resistant performance, the above liquid crystal polyester preferably comprises 10 to 30 mole % of the repeating structural unit represented by the above formula (1), 40 to 80 mole % of the repeating structural unit represented by the above formula (2), and 10 to 30 mole % of a repeating structural unit represented by the following formula (3):

[Chemical Formula 3]

(3)

wherein X represents a divalent group having an aromatic ring.

In terms of heat resistance, the above liquid crystal polyester comprises 2 to 29 mole % of the repeating structural unit represented by the above formula (1), 40 to 80 mole % of the repeating structural unit represented by the above formula (2), 10 to 30 mole % of a repeating structural unit represented by the following formula (3), and 1 to 28 mole % of a repeating structural unit represented by the following formula (4), and the liquid crystal polyester preferably comprises 1 mole % or more of a repeating structural unit represented by the following formula (5) as the repeating structural unit represented by the above formula (4):

[Chemical Formula 4]

(3)

wherein X represents a divalent group having an aromatic ring;

[Chemical Formula 5]

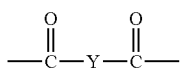
(4)

wherein Y represents a divalent group having an aromatic ring; and

[Chemical Formula 6]

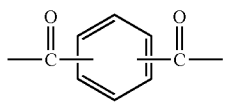
(5)

wherein two bonds of an aromatic ring are in a meta or para relationship.

The above liquid crystal polyester is preferably obtained by two-stage polymerization of melt polycondensation and solid phase polycondensation. In this case, a liquid crystal polyester which has sufficient mechanical properties and heat resistance and in which coloring is further suppressed can be obtained by adjusting a reaction temperature in the melt polycondensation and the solid phase polycondensation. Thus, sufficient light reflectance can be achieved even if the amount of the titanium oxide to be blended is decreased, and a molded body satisfying light resistance, mechanical properties, and heat resistance in higher levels is easily obtained.

Further, in terms of heat resistance and molding processability, a melting point of the above liquid crystal polyester is preferably 300° C. or more and 380° C. or less.

The present invention also provides a molded body comprising the above liquid crystal polyester resin composition of the present invention. The molded body of the present invention can have optical properties (light resistance) which provide sufficient light reflectance and in which discoloration due to light is little and light reflectance is less likely to decrease, excellent heat resistance, and excellent mechanical properties. The molded body of the present invention preferably has a DTUL of 220° C. or more in terms of ensuring heat resistance capable of withstanding solder reflow.

The present invention also provides an LED reflector comprising the above liquid crystal polyester resin composition of the present invention. The LED reflector of the present invention can have optical properties (light resistance) which provide sufficient light reflectance and in which discoloration due to light is little and light reflectance is less likely to decrease, excellent heat resistance, and excellent mechanical properties.

Advantageous Effects of Invention

According to the present invention, it is possible to provide a liquid crystal polyester resin composition capable of producing a molded body which has sufficient light reflectance and in which discoloration due to light is little and light reflectance is less likely to decrease, and the molded body and an LED reflector thereof.

DESCRIPTION OF EMBODIMENTS

A liquid crystal polyester resin composition of the present embodiment comprises: 100 parts by mass of a liquid crystal polyester (hereinafter, sometimes simply abbreviated as "LCP"); and 50 to 150 parts by mass of titanium oxide, wherein the liquid crystal polyester comprises 2 to 30 mole % of a repeating structural unit represented by the following formula (1), and 40 to 80 mole % of a repeating structural unit represented by the following formula (2).

[Chemical Formula 7]

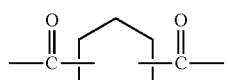
(1)

[Chemical Formula 8]

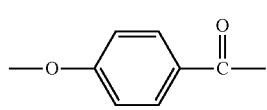
(2)

Two bonds of a cyclohexyl group of the structural unit represented by the above formula (1) are in a meta position or a para position, and the structural unit represented by the formula (1) may be any one or a mixture of two.

In the above LCP, in terms of exhibition of liquid crystallinity during melting and heat resistance, the two bonds of the cyclohexyl group of the structural unit represented by the formula (1) are preferably in a para relationship.

The content of the structural unit represented by the formula (1) in the above LCP is 2 to 30 mole %. If this content is less than 2 mole %, sufficient light resistant performance is not obtained, and if the content is more than 30 mole %, sufficient heat resistance and molding processability are not obtained. In terms of the balance of light resistance, heat resistance, and molding processability, the content of the structural unit represented by the formula (1) is preferably 5 to 25 mole %, and more preferably 10 to 20 mole %.

The content of the structural unit represented by the formula (2) in the above LCP is 40 to 80 mole %. If this content is less than 40 mole %, sufficient heat resistance is not obtained, and if the content is more than 80 mole %, sufficient molding processability is not obtained. In terms of improving both molding processability and heat resistance, the content of the structural unit represented by the formula (2) is preferably 50 to 70 mole %, and more preferably 60 to 70 mole %.

The above LCP can further contain a repeating structural unit represented by the following formula (3), or the repeating structural unit represented by the following formula (3) and a repeating structural unit represented by the following formula (4):

[Chemical Formula 9]

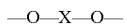

—O—X—O—      (3)

wherein X represents a divalent group having an aromatic ring; and

[Chemical Formula 10]

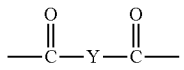

(4)

wherein Y represents a divalent group having an aromatic ring.

In the above LCP, the structural unit represented by the formula (3) and the structural unit represented by the formula (4) each may be one or more.

Examples of the structural units represented by the above formulae (3) and (4) include structural units represented by the following formulae (3-1) and (4-1), respectively.

[Chemical Formula 11]

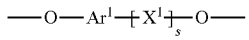

(3-1)

[Chemical Formula 12]

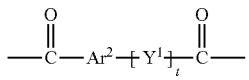

(4-1)

wherein $Ar^1$ and $Ar^2$ each represent a divalent aromatic group, $X^1$ and $Y^1$ each represent a divalent group having an aromatic ring, and s and t each represent an integer of 0 or 1.

As $Ar^1$ and $Ar^2$, a divalent aromatic group represented by the following formula (Ar-1) or (Ar-2) is preferable in terms of heat resistance and molding processability. Two bonds of a benzene ring represented by the formula (Ar-1) are in a meta or para relationship,

[Chemical Formula 13]

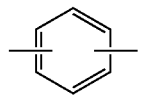

(Ar-1)

[Chemical Formula 14]

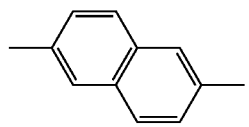

(Ar-2)

Examples of $X^1$ include divalent groups represented by the following formula (3-2).

[Chemical Formula 15]

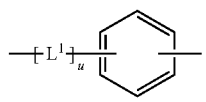

(3-2)

In the formula (3-2), $L^1$ represents a divalent hydrocarbon group, —O—, —S—, —CO—, —SO—, or —SO$_2$—, and u represents an integer of 0 or 1. Examples of the divalent hydrocarbon group include alkanediyl groups having 1 to 3 carbon atoms, and among them, —C(CH$_3$)$_2$— or —CH(CH$_3$)— is preferable. Two bonds of a benzene ring in the formula (3-2) are in a meta or para relationship.

Examples of $Y^1$ include divalent groups represented by the following formula (4-2).

[Chemical Formula 16]

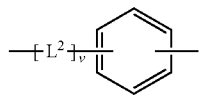

(4-2)

In the formula (4-2), $L^2$ represents a divalent hydrocarbon group, —O—, —S—, —SO—, —CO—, or —SO$_2$—, and v represents an integer of 0 or 1. Examples of the divalent hydrocarbon group include alkanediyl groups having 1 to 3 carbon atoms, and among them, —C(CH$_3$)$_2$— or —CH(CH$_3$)— is preferable. Two bonds of a benzene ring in the formula (4-2) are in a meta or para relationship.

When the above LCP further contains the repeating structural unit represented by the above formula (3), the contents of the repeating structural unit represented by the formula (1), the repeating structural unit represented by the formula (2), and the repeating structural unit represented by the formula (3) can be set so that their total is 100 mole % and also the content of the structural unit of the formula (1) are equal to the content of the structural unit of the formula (3).

Specific examples include a liquid crystal polyester (hereinafter, sometimes referred to as an LCP according to a first embodiment) comprising 10 to 30 mole % of the repeating structural unit represented by the above formula (1), 40 to 80 mole % of the repeating structural unit represented by the above formula (2), and 10 to 30 mole % of the repeating structural unit represented by the above formula (3).

The LCP according to the first embodiment preferably contains one or more of a repeating structural unit represented by the following formula (3-3) and a repeating structural units represented by the following formula (3-4) as the repeating structural unit represented by the above formula (3).

[Chemical Formula 17]

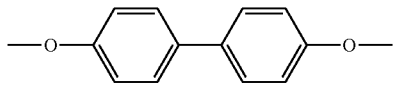
(3-3)

[Chemical Formula 18]

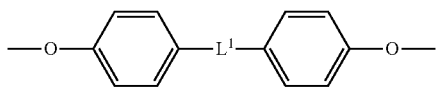
(3-4)

In the formula (3-4), $L^1$ is synonymous with the above described $L^1$. $L^1$ is particularly preferably a divalent hydrocarbon group, —CO—, or —SO$_2$—.

Further, in terms of heat resistance, the LCP according to the first embodiment preferably contains 15 to 25 mole % of the repeating structural unit represented by the above formula (3-3) as the repeating structural unit represented by the above formula (3), and more preferably 15 to 20 mole %.

When the above LCP further contains the repeating structural unit represented by the above formula (3) and the repeating structural unit represented by the above formula (4), the contents of the repeating structural unit represented by the formula (1), the repeating structural unit represented by the formula (2), the repeating structural unit represented by the formula (3), and the repeating structural unit represented by the formula (4) can be set so that their total is 100 mole % and also the total of the contents of the structural units of the formulae (1) and (4) are equal to the content of the structural unit of the formula (3).

Specific examples include a liquid crystal polyester (hereinafter, sometimes referred to as an LCP according to a second embodiment) comprising 2 to 29 mole % of the repeating structural unit represented by the above formula (1), 40 to 80 mole % of the repeating structural unit represented by the above formula (2), 10 to 30 mole % of the repeating structural unit represented by the above formula (3), and 1 to 28 mole % of the repeating structural unit represented by the above formula (4).

The LCP according to the second embodiment preferably contains one or more of repeating structural units represented by the following formula (5) as the repeating structural unit represented by the above formula (4). Two bonds of a benzene ring in the formula (5) are in a meta or para relationship.

[Chemical Formula 19]

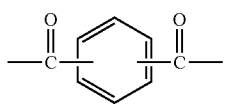
(5)

In terms of heat resistance and molding processability, the LCP according to the second embodiment preferably contains 1 mole % or more of a repeating structural unit represented by the following formula (6) as the repeating structural unit represented by the above formula (5), more preferably 1 to 10 mole %, and still more preferably 1 to 5 mole %.

[Chemical Formula 20]

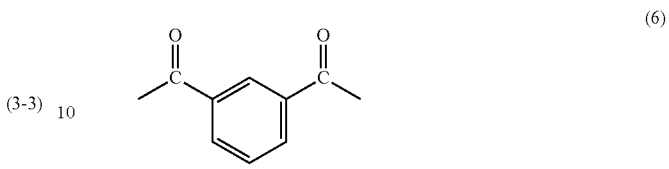
(6)

The LCP according to the first embodiment can be obtained, for example, by copolymerizing cyclohexane dicarboxylic acid, p-hydroxybenzoic acid, and an aromatic dihydroxy compound. A monomer ratio at this time is set so that the repeating structural unit represented by the above formula (1), the repeating structural unit represented by the above formula (2), and the repeating structural unit represented by the above formula (3) in the LCP are within the above-mentioned ranges, respectively.

Examples of the cyclohexane dicarboxylic acid include 1,3-cyclohexane dicarboxylic acid and 1,4-cyclohexanedicarboxylic acid. One of these can be used alone, or two of these can be used in combination. It is preferable to copolymerize so that 5 mole % to 25 mole % of 1,4-cyclohexanedicarboxylic acid is contained, in terms of molding processability and heat resistance.

Examples of the aromatic dihydroxy compound include hydroquinone, 4,4'-dihydroxybiphenyl, 4,4'-dihydroxybenzophenone, 2,6-naphthalenediol, 4,4'-isopropylydene diphenol, and bisphenol-S. One of these can be used alone, or two or more of these can be used in combination. It is preferable to copolymerize so that 15 mole % to 25 mole % of 4,4'-dihydroxybiphenyl is contained, in terms of molding processability and heat resistance.

The LCP according to the second embodiment can be obtained, for example, by copolymerizing the above cyclohexane dicarboxylic acid, the p-hydroxybenzoic acid, the above aromatic dihydroxy compound, and the aromatic dicarboxylic acid. A monomer ratio at this time is set so that the repeating structural unit represented by the above formula (1), the repeating structural unit represented by the above formula (2), the repeating structural unit represented by the above formula (3), and the repeating structural unit represented by the above formula (4) in the LCP are within the above-mentioned ranges, respectively.

Examples of the aromatic dicarboxylic acid include terephthalic acid, isophthalic acid, 2,6-naphthalenedicarboxylic acid, 4,4'-biphenyldicarboxylic acid, and benzophenone-4,4'-dicarboxylic acid. One of these can be used alone, or two or more of these can be used in combination.

In the LCP according to the second embodiment, it is preferable to copolymerize so that 1 to 5 mole % of isophthalic acid is contained in the LCP, in terms of molding processability and heat resistance.

In terms of light resistance and heat resistance, it is preferable to copolymerize so that 10 to 20 mole % of 1,4-cyclohexanedicarboxylic acid is contained. Further, in terms of molding processability and heat resistance, it is preferable to copolymerize so that 15 to 20 mole % of 4,4'-dihydroxybiphenyl is contained.

Examples of a method for preparing the LCP according to the first and second embodiments include a method of charging the above compounds in a proportion in which a monomer composition in the LCP is within the above range and performing melt polycondensation.

In the production of the LCP, in order to shorten melt polycondensation time and reduce the effect of a thermal history during steps, it is preferable to perform melt polycondensation after previously acetylating the hydroxyl groups of the above monomers. Further, in order to simplify the steps, the acetylation is preferably performed by feeding acetic anhydride to the monomers in a reaction vessel, and it is preferable to perform such acetylation step using the same reaction vessel as in the melt polycondensation step. In other words, it is preferable to perform the acetylation reaction of the raw material monomers with acetic anhydride in a reaction vessel and, after the completion of the reaction, increase temperature for transition to a polycondensation reaction. Acetic anhydride is preferably fed in excess of 1 to 10 mole % of acetic anhydride with respect to the number of moles of the hydroxyl groups of the monomers. If the excessive amount of acetic anhydride is less than 1 mole %, there is a tendency that a reaction rate is slow and the LCP is colored, and if the excessive amount of acetic anhydride is more than 10 mole %, there is a tendency that the LCP is colored by the effect of residual acetic anhydride.

The acetylated monomers can be subjected to a melt polycondensation reaction with an acetic acid removal reaction. As the reaction vessel, it is preferable to use a reaction vessel provided with monomer feed means, acetic acid discharge means, molten polyester extraction means, and stirring means. Such a reaction vessel (polycondensation apparatus) can be appropriately selected from known ones. A polymerization temperature is preferably 150° C. to 350° C. It is preferable to, after the completion of the acetylation reaction, increase temperature to a polymerization initiation temperature to initiate polycondensation and increase the temperature to 280 to 350° C. as a final temperature at temperature increase rate of 0.1° C./min to 2° C./min. Thus, it is preferable to increase polycondensation temperature correspondingly to the fact that the melting temperature of a produced polymer increases with the progress of polycondensation. In the polycondensation reaction, catalysts known as polycondensation catalysts for polyesters can be used. Examples of the catalysts include metal catalysts such as magnesium acetate, stannous acetate, tetrabutyl titanate, lead acetate, sodium acetate, and potassium acetate, and organic compound catalysts such as N-methylimidazole.

In the melt polycondensation, when the temperature of the melt polymer in the reaction vessel reaches 200° C. or more, and preferably 220° C. to 330° C., a liquid crystal polyester having a low degree of polymerization is extracted from the polymerization vessel in a molten state, fed to a cooling machine such as a steel belt or a drum cooler, and cooled and solidified.

Then, the solidified liquid crystal polyester having a low degree of polymerization is ground to a size suitable for the subsequent solid phase polycondensation reaction. A grinding method is not particularly limited, and preferable examples include methods using apparatuses such as impact type grinding machines such as Feather Mill, Victory Mill, Kolloplex, Pulverizer, Contraplex, Scroll Mill, and ACM Pulverizer manufactured by Hosokawa Micron Corporation, and Roll Granulator which is a cracking type grinding machine manufactured by MATSUBO Corporation. The grinding method is particularly preferably a method using Feather Mill manufactured by Hosokawa Micron Corporation. In the present invention, although there is no particular limitation on the particle diameter of a ground product, the particle diameter is preferably in the range of passing through 4 mesh to not passing through 2000 mesh with an industrial sieve (Tyler mesh), more preferably in the range of 5 mesh to 2000 mesh (mesh opening: 0.01 to 4 mm), and most preferably in the range of 9 mesh to 1450 mesh (mesh opening: 0.02 to 2 mm).

Then, the ground product (prepolymer) obtained in the grinding step is subjected to a solid phase polycondensation step to perform solid phase polycondensation. There is no particular limitation on an apparatus used for the solid phase polycondensation step, and its operation conditions, and known apparatuses and methods can be used.

The LCP according to the present embodiment is preferably obtained by two-stage polymerization of melt polycondensation and solid phase polycondensation because one in which coloration is little can be obtained.

In the present embodiment, it is preferable that a melt polycondensation temperature is not more than 320° C., more preferably 315° C. or less, and still more preferably 290° C. to 310° C. If this temperature is less than 290° C., there is a tendency that a prepolymer having a sufficient degree of polymerization is not obtained, and if the temperature is more than 315° C., there is a tendency that the LCP is easily colored. The above melt polycondensation temperature is a temperature of a melt polymer capable of being detected by a thermocouple placed in the reaction vessel.

A temperature increase rate of melt polycondensation temperature is preferably in the range from 0.1 to 5.0° C./min. The temperature increase rate is more preferably in the range from 0.3 to 3.0° C./min. If the temperature increase rate is less than 0.1° C./min, production efficiency remarkably decreases, and if the temperature increase rate is more than 5.0° C., an unreacted component increases, and there is a possibility that the increase of the unreacted component causes coloring in the solid phase polycondensation.

In the present embodiment, it is preferable to, after the completion of the acetylation reaction, increase temperature to initiate polycondensation and increase the temperature to 290 to 320° C. as a final temperature at a temperature increase rate of 0.1° C./min to 2° C./min, and it is more preferable to increase the temperature to 300 to 310° C.

It is preferable that the solid phase polycondensation temperature is not more than 320° C., more preferably 315° C. or less, and still more preferably 290° C. to 310° C. If the temperature is less than 290° C., there is a tendency that a prepolymer having a sufficient degree of polymerization is less likely to be obtained, and if the temperature is more than 315° C., there is a tendency that the LCP is easily colored. The above solid phase polycondensation temperature is a temperature of a polymer powder capable of being detected by a thermocouple placed in the reaction vessel.

As described above, a liquid crystal polyester which has sufficient mechanical properties and heat resistance and in which coloring is further suppressed can be obtained by adjusting a reaction temperature in the melt polycondensation and the solid phase polycondensation. Thus, sufficient light reflectance can be achieved even if the amount of the titanium oxide to be blended is decreased, and a molded body satisfying light resistance, mechanical properties, and heat resistance in higher levels is easily obtained.

The LCP according to the present invention preferably has a melting point of 300° C. or more and 380° C. or less, in terms of heat resistance and molding processability.

The LCP according to the present embodiment is a thermotropic liquid crystal, and this can be confirmed according to the following procedure. A polarization microscope BH-2 (manufactured by Olympus Co., Ltd.) provided with a cooling/heating stage model 10002 for microscopes manufactured by Japan High Tech Co., Ltd. is used, and a polyester sample is heated and melted on the microscope heating stage. The existence or nonexistence of optical anisotropy can be confirmed by observing the polyester sample at magnifications of 100 times and 200 times during melting.

The content of the LCP according to the present embodiment in the liquid crystal polyester resin composition is preferably 40 to 60% by mass based on the total amount of the resin composition.

Titanium oxide used in the present invention means particles of $TiO_2$ and is widely used as a white pigment. The titanium oxide particles are preferably rutile type titanium oxide particles which are stable even at high temperature and have large light hiding power. The titanium oxide particles are preferably those in which primary (number average) particle diameter is 0.1 to 0.5 μm, and more preferably 0.2 to 0.3 μm. When the primary number average particle diameter is in this range, light scattering efficiency is high, the light reflectance of the molded surface of a molded body increases, and one having high brightness is easily obtained. If the particle diameter is less than 0.1 μm, a result is that a light scattering effect is small, and the brightness of the molded surface decreases, and if the particle diameter is more than 0.5 μm, there is a tendency that the dispersibility of the titanium oxide particles in the resin (LCP) worsens, which is not preferable for a case where a filling amount is increased in terms of workability. For the titanium oxide particles, commercial products, for example, SR-1 (trade name, manufactured by Sakai Chemical Industry Co., Ltd.) can be used.

The content of the titanium oxide particles in the resin composition is 50 to 150 parts by mass with respect to 100 parts by mass of the liquid crystal polyester, and is preferably 70 to 130 parts by mass. If the content of the titanium oxide particles is less than the above lower limit value, there is a tendency that a sufficient degree of whiteness is not obtained, and on the other hand, if the content of the titanium oxide particles is more than the above upper limit value, the heat resistance of a molded body obtained by injection molding the resin composition is insufficient, and a possibility that blistering occurs when the molded body is heat treated increases, and therefore, there is a tendency that it is difficult to use the resin composition as reflector member applications which require a good molded surface.

A white pigment other than titanium oxide particles can be blended in the liquid crystal polyester resin composition of the present invention unless the effect of the invention of this application is not impaired. Examples of the white pigment include zinc oxide and lead carbonate.

Preferably, the liquid crystal polyester resin composition of the present invention further contains a fibrous inorganic filler. Examples of the fibrous inorganic filler include glass fibers, alumina fibers, and wollastonite.

As the glass fibers, those used as general resin reinforcement materials such as chopped strands and milled fibers can be preferably used, and the chopped strands are preferable. The fiber length of the glass fiber to be used is 100 μm to 10 mm in terms of number average length, preferably 200 μm to 5 mm, and more preferably 200 μm to 3 mm. The thickness of the glass fiber is preferably a number average diameter of 5 to 20 μm in terms of flowability during injection molding, and is more preferably a number average diameter of 7 to 15 μm. Preferable specific examples of the glass fibers include "PX-1" (number average fiber diameter: 10 μm, number average fiber length: 3 ram) manufactured by OWENS CORNING JAPAN LTD.

Further, an inorganic filler, for example, talc, mica, or silica can be blended in the liquid crystal polyester resin composition of the present invention unless the effect of the invention of this application is not impaired, to provide desired properties.

When the liquid crystal polyester resin composition of the present invention comprises the fibrous inorganic filler, the content is preferably 5 to 50 parts by mass with respect to 100 parts by mass of the liquid crystal polyester. If the content of the fibrous inorganic filler is less than the lower limit value, the effect of reinforcement is less likely to be exhibited, and if the content of the fibrous inorganic filler is more than the upper limit value, there is a tendency that the productivity and molding processability of the resin composition decrease significantly.

One or more of various additives can be blended in the liquid crystal polyester resin composition of the present invention unless it does not interfere with the object of the present invention. Examples of the additives include usual additives such as powdery or acicular inorganic fillers such as silica, talc, and potassium titanate whiskers, antioxidants and heat stabilizers (for example, hindered phenols, hydroquinone, phosphites and substitution products thereof), ultraviolet-absorbing agents (for example, resorcinol, salicylate, benzotriazole, and benzophenone), lubricants and release agents (montanic acid and salts, esters, and half esters thereof, stearyl alcohol, stearamide, and polyethylene wax or the like), plasticizers, antistatic agents, and flame retardants, and other thermoplastic resins. These additives can be added to provide desired properties to the resin composition.

The liquid crystal polyester resin composition of the present invention preferably has a complete melting temperature of 300° C. or more and 380° C. or less. Herein, the complete melting temperature of the resin composition means a change temperature from the crystalline phase to the liquid crystalline phase of the resin composition as described in Japanese Patent Application Laid-Open No. 10-95839, and this change temperature can be determined from an apparent viscosity-temperature curve. If the complete melting temperature is less than 300° C., the heat resistance of a molded body of the liquid crystal polyester resin composition may be insufficient, which is not preferable. On the other hand, if the complete melting temperature is more than 380° C., the molding processing temperature of the liquid crystal polyester resin composition is high, and therefore, a molded body surface may be discolored by excessive heat.

The liquid crystal polyester resin composition of the present invention can be subjected to molding processing at 390° C. or less and can form a molded body in which discoloration due to a thermal history is less, which sufficiently satisfies a degree of whiteness and heat resistance, and in which discoloration due to light irradiation is less than that of conventional liquid crystal polyester resin compositions.

The liquid crystal polyester resin composition of the present invention can be suitabley used as a resin composition for molding an LED reflector.

In the molded body obtained by molding the liquid crystal polyester resin composition of the present invention, light reflectance on the molded surface of the molded body, for light having a wavelength of 480 nm is preferably 70% or more, more preferably 80% or more, and still more preferably 85% or more. More specifically, the 480 nm wave light reflectance (relative reflectance when the diffuse reflectance of a standard white plate of barium sulfate is taken as 100%) of the surface of a 3 mm thick flat plate test piece obtained by injection molding under standard conditions using a standard mold is preferably 70% or more, more preferably 80% or more, and still more preferably 85% or more. If such reflectance is less than the lower limit, there is a tendency that the molded body obtained from the resin composition cannot satisfy light reflection performance required as a reflector.

According to the liquid crystal polyester resin composition of the present invention, a decrease in light reflectance on the molded surface of the molded body after 480 nm light irradiation can be sufficiently suppressed. Specifically, the liquid crystal polyester resin composition of the present invention enables a difference between light reflectance before light irradiation and light reflectance after 500 hour light irradiation to be suppressed to 10% or less. Also, the molded body obtained by subjecting the liquid crystal polyester resin composition of the present invention to injection molding can maintain the above light reflectance after 500 hour light irradiation at 75% or more.

According to the liquid crystal polyester resin composition of the present invention, it is possible to obtain a molded body having mechanical properties in which a flexural modulus is 6.0 GPa or more. In this case, even if the molded body is thin-walled, the molded body can have sufficient rigidity.

According to the liquid crystal polyester resin composition of the present invention, it is possible to obtain a molded body having heat resistance in which a distortion temperature under load (DTUL) is 220° C. or more. In this case, it is possible to withstand solder reflow.

The liquid crystal polyester resin composition of the present invention can be obtained by melting and kneading the above-described components (the liquid crystal polyester, the titanium oxide particles, and the fibrous inorganic filler as required). As an apparatus for melting and kneading, twin screw kneading machines can be used. More preferably, continuous extrusion type twin screw kneading machines having a pair of double thread screws can be used, and among them, a corotating type which allows the uniform dispersion of the filler by having a turning mechanism is preferable. When one which has a cylinder diameter of 40 mmϕ or more with a large barrel-screw gap making the entry of the filler easy, in which a gap between screws is large and an intermeshing rate is 1.45 or more, and in which the filler can be fed from the middle of a cylinder is used, the resin composition of the present invention can be efficiently obtained. It is preferable to use one having equipment for feeding at least part of glass fibers to the middle of a cylinder.

It is preferable that the liquid crystal polyester and the titanium oxide particles are mixed using known solid mixing equipment, for example, a ribbon blender, a tumbler blender, or a Henschel mixer or the like, and the mixture is dried by a hot air dryer or a reduced pressure dryer or the like as required, and fed from the hopper of a twin screw kneading machine.

In the production of a resin composition containing a fibrous inorganic filler such as glass fibers, it is preferable to feed at least part of glass fibers to be blended from the middle of the cylinder of a twin screw kneading machine (so-called side feed). Thus, there is a tendency that the mechanical strength of the welded portion of a molded body prepared by injection molding the obtained resin composition improves more than in a case where all glass fibers are fed from a hopper together with other raw materials (so-called top feed). The proportion of the glass fibers for side feed, of the total amount of the glass fibers to be blended is preferably 50% or more, and most preferably 100%. If the proportion of the glass fibers for side feed is less than the above lower limit, there is a tendency that compounding (blending and mixing) is difficult and a homogeneous resin composition cannot be obtained.

The molded body of the present invention is prepared by molding the liquid crystal polyester resin composition of the present invention described above. Examples of a molding method include injection molding, extrusion molding, and press molding, and injection molding using an injection molding machine is preferable in terms of the ease of molding, mass productivity, and cost or the like. For example, by injection molding the liquid crystal polyester resin composition of the present invention which is pelletized and using the surface of the injection-molded article as a reflective surface, an LED reflector which is excellent in light reflectance and heat resistance and is less likely to be discolored by light can be obtained. Particularly, the resin composition of the present invention is less likely to be discolored than conventional liquid crystal polyester resin compositions even if it receives light in ultraviolet light to visible light regions, and therefore, an LED reflector also suitable for a high power LED can be obtained.

In the LED reflector of the present invention, light reflectance on a surface for light having a wavelength of 480 nm is preferably 70% or more, more preferably 80% or more, and still more preferably 85% or more.

EXAMPLES

The present invention will be more specifically described below with reference to examples, but the present invention is not limited to the following examples.

<Production of Liquid Crystal Polyesters>

First, production examples of liquid crystal polyesters are shown below. The monomer composition (mole %) and melting point of the produced polyesters are also shown in Table 1.

Production Example 1

Production of Liquid Crystal Polyester (A)

Into a polymerization reaction vessel (manufactured by Nitto Kouatsu Co., Ltd.) using SUS316 as a material, having a double helical stirring blade, and having an internal volume of 6 L, 0.83 kg (6.0 moles) of p-hydroxybenzoic acid (manufactured by UENO FINE CHEMICALS INDUSTRY, LTD.), 0.37 kg (2.0 moles) of 4,4'-dihydroxybiphenyl (manufactured by Honshu Chemical Industry Co., Ltd.), 0.34 kg (2.0 moles) of 1,4-cyclohexanedicarboxylic acid (manufactured by Eastman Chemical Company), 0.15 g of potassium acetate (manufactured by KISHIDA CHEMICAL Co., Ltd.) as a catalyst, and 0.50 g of magnesium acetate (manufactured by KISHIDA CHEMICAL Co., Ltd.) were charged, and pressure reduction-nitrogen injection in the polymerization reaction vessel was performed twice to perform nitrogen replacement. Then 1.07 kg (10.5 moles) of acetic anhydride was further added, the rotation rate of the stirring blade was set to 70 rpm, temperature was increased to 150° C. over 1.5 hours, and an acetylation reaction was performed in a reflux state for 2 hours.

After the completion of acetylation, the temperature of the polymerization reaction vessel in an acetic acid distillation state was increased at 0.5° C./min, and when a melt temperature in the vessel reached 310° C., a polymer was removed from an extraction port in the lower portion of the reaction vessel, and cooled and solidified by a cooling apparatus. The obtained polymer was ground to a size passing through a sieve having an opening of 2.0 mm by a grinding machine manufactured by Hosokawa Micron Corporation to obtain a prepolymer.

Next, the prepolymer obtained above was charged into a solid phase polymerization apparatus (rotary kiln) manufactured by IRIE SHOKAI Co., Ltd., nitrogen was flowed at a flow rate of 0.2 Nm³/hr, and at a rotation rate of 5 rpm, a heater temperature was increased from room temperature to 190° C. over 3 hours, then increased to 280° C. over 5 hours, further increased to 320° C. over 3 hours, and perform solid phase polycondensation with the temperature held. After confirming that a polymer powder temperature in the kiln reached 300° C., heating was stopped, and cooling was performed over 4 hours while the kiln was rotated. When the molten state of the polymer obtained by the solid phase polycondensation was observed with a polarization microscope, the polymer showed optical anisotropy, which confirms liquid crystallinity. In this manner, about 2 kg of a powdery thermotropic liquid crystal polyester (A) was obtained. The melting point of the obtained thermotropic liquid crystal polyester (A) was 345° C.

Production Example 2

Production of Liquid Crystal Polyester (B)

Into a polymerization reaction vessel (manufactured by Nitto Kouatsu Co., Ltd.) using SUS316 as a material, having a double helical stirring blade, and having an internal volume of 6 L, 1.10 kg (8.0 moles) of p-hydroxybenzoic acid (manufactured by UENO FINE CHEMICALS INDUSTRY, LTD.), 0.18 kg (1.0 mole) of 4,4'-dihydroxybiphenyl (manufactured by Honshu Chemical Industry Co., Ltd.), 0.17 kg (1.0 mole) of 1,4-cyclohexanedicarboxylic acid (manufactured by Eastman Chemical Company), 0.15 g of potassium acetate (manufactured by KISHIDA CHEMICAL Co., Ltd.) as a catalyst, and 0.50 g of magnesium acetate (manufactured by KISHIDA CHEMICAL Co., Ltd.) were charged, and pressure reduction-nitrogen injection in the polymerization reaction vessel was performed twice to perform nitrogen replacement. Then 1.07 kg (10.5 moles) of acetic anhydride was further added, the rotation rate of the stirring blade was set to 70 rpm, temperature was increased to 150° C. over 1.5 hours, and an acetylation reaction was performed in a reflux state for 2 hours.

Next, as in production example 1, a prepolymer was obtained, and then, solid phase polymerization was performed to obtain a thermotropic liquid crystal polyester (B). The melting point of the obtained thermotropic liquid crystal polyester was 342° C.

Production Example 3

Production of Liquid Crystal Polyester (C)

Into a polymerization reaction vessel (manufactured by Nitto Kouatsu Co., Ltd.) using SUS316 as a material, having a double helical stirring blade, and having an internal volume of 6 L, 0.55 kg (4.0 moles) of p-hydroxybenzoic acid (manufactured by UENO FINE CHEMICALS INDUSTRY, LTD.), 0.56 kg (3.0 moles) of 4,4'-dihydroxybiphenyl (manufactured by Honshu Chemical Industry Co., Ltd.), 0.52 kg (3.0 moles) of 1,4-cyclohexanedicarboxylic acid (manufactured by Eastman Chemical Company), 0.15 g of potassium acetate (manufactured by KISHIDA CHEMICAL Co., Ltd.) as a catalyst, and 0.50 g of magnesium acetate (manufactured by KISHIDA CHEMICAL Co., Ltd.) were charged, and pressure reduction-nitrogen injection in the polymerization reaction vessel was performed twice to perform nitrogen replacement. Then 1.07 kg (10.5 moles) of acetic anhydride was further added, the rotation rate of the stirring blade was set to 70 rpm, temperature was increased to 150° C. over 1.5 hours, and an acetylation reaction was performed in a reflux state for 2 hours.

Next, as in production example 1, a prepolymer was obtained, and then, solid phase polymerization was performed to obtain a thermotropic liquid crystal polyester (C). The melting point of the obtained thermotropic liquid crystal polyester was 350° C.

Production Example 4

Production of Thermotropic Liquid Crystal Polyester (D)

Into a polymerization reaction vessel (manufactured by Nitto Kouatsu Co., Ltd.) using SUS316 as a material, having a double helical stirring blade, and having an internal volume of 6 L, 0.83 kg (6.0 moles) of p-hydroxybenzoic acid (manufactured by UENO FINE CHEMICALS INDUSTRY, LTD.), 0.28 kg (1.5 moles) of 4,4'-dihydroxybiphenyl (manufactured by Honshu Chemical Industry Co., Ltd.), 0.11 kg (0.5 moles) of 4,4'-dihydroxybenzophenone (manufactured by Benzo Chem Industries Pvt. Limited), 0.34 kg (2.0 moles) of 1,4-cyclohexanedicarboxylic acid (manufactured by Eastman Chemical Company), 0.15 g of potassium acetate (manufactured by KISHIDA CHEMICAL Co., Ltd.) as a catalyst, and 0.50 g of magnesium acetate (manufactured by KISHIDA CHEMICAL Co., Ltd.) were charged, and pressure reduction-nitrogen injection in the polymerization reaction vessel was performed twice to perform nitrogen replacement. Then 1.07 kg (10.5 moles) of acetic anhydride was further added, the rotation rate of the stirring blade was set to 70 rpm, temperature was increased to 150° C. over 1.5 hours, and an acetylation reaction was performed in a reflux state for 2 hours.

Next, as in production example 1, a prepolymer was obtained, and then, solid phase polymerization was performed to obtain a thermotropic liquid crystal polyester (D). The melting point of the obtained thermotropic liquid crystal polyester was 340° C.

Production Example 5

Production of Liquid Crystal Polyester (E)

Into a polymerization reaction vessel (manufactured by Nitto Kouatsu Co., Ltd.) using SUS316 as a material, having a double helical stirring blade, and having an internal volume of 6 L, 0.83 kg (6.0 moles) of p-hydroxybenzoic acid (manufactured by UENO FINE CHEMICALS INDUSTRY, LTD.), 0.28 kg (1.5 moles) of 4,4'-dihydroxybiphenyl (manufactured by Honshu Chemical Industry Co., Ltd.), 0.11 kg (0.5 mole) of 4,4'-isopropylydene diphenol (manufactured by Mitsui Chemicals, Inc.), 0.34 kg (2.0 moles) of 1,4-cyclohexanedicarboxylic acid (manufactured by Eastman Chemical Company), 0.15 g of potassium acetate (manufactured by KISHIDA CHEMICAL Co., Ltd.) as a catalyst, and 0.50 g of magnesium acetate (manufactured by KISHIDA CHEMICAL Co., Ltd.) were charged, and pressure reduction-nitrogen injection in the polymerization reaction vessel was performed twice to perform nitrogen replacement. Then 1.07 kg (10.5 moles) of acetic anhydride was further added, the rotation rate of the stirring blade was set to 70 rpm, temperature was increased to 150° C. over 1.5 hours, and an acetylation reaction was performed in a reflux state for 2 hours.

Next, as in production example 1, a prepolymer was obtained, and then solid phase polymerization was performed to obtain a thermotropic liquid crystal polyester (E). The melting point of the obtained thermotropic liquid crystal polyester was 338° C.

Production Example 6

Production of Liquid Crystal Polyester (F)

Into a polymerization reaction vessel (manufactured by Nitto Kouatsu Co., Ltd.) using SUS316 as a material, having a double helical stirring blade, and having an internal volume of 6 L, 0.83 kg (6.0 moles) of p-hydroxybenzoic acid (manufactured by UENO FINE CHEMICALS INDUSTRY, LTD.), 0.37 kg (2.0 moles) of 4,4'-dihydroxybiphenyl (manufactured by Honshu Chemical Industry Co., Ltd.), 0.29 kg (1.7 moles) of 1,4-cyclohexanedicarboxylic acid (manufactured by Eastman Chemical Company), 0.05 kg (0.3 mole) of isophthalic acid (manufactured by A.G International Company Inc.), 0.15 g of potassium acetate (manufactured by KISHIDA CHEMICAL Co., Ltd.) as a catalyst, and 0.50 g of magnesium acetate (manufactured by KISHIDA CHEMICAL Co., Ltd.) were charged, and pressure reduction-nitrogen injection in the polymerization reaction vessel was performed twice to perform nitrogen replacement. Then 1.07 kg (10.5 moles) of acetic anhydride was further added, the rotation rate of the stirring blade was set to 70 rpm, temperature was increased to 150° C. over 1.5 hours, and an acetylation reaction was performed in a reflux state for 2 hours.

Next, as in production example 1, a prepolymer was obtained, and then solid phase polymerization was performed to obtain a thermotropic liquid crystal polyester (F). The melting point of the obtained thermotropic liquid crystal polyester was 345° C.

Production Example 7

Production of Liquid Crystal Polyester (G)

Into a polymerization reaction vessel (manufactured by Nitto Kouatsu Co., Ltd.) using SUS316 as a material, having a double helical stirring blade, and having an internal volume of 6 L, 0.55 kg (4.0 moles) of p-hydroxybenzoic acid (manufactured by UENO FINE CHEMICALS INDUSTRY, LTD.), 0.56 kg (3.0 moles) of 4,4'-dihydroxybiphenyl (manufactured by Honshu Chemical Industry Co., Ltd.), 0.03 kg (0.2 mole) of 1,4-cyclohexanedicarboxylic acid (manufactured by Eastman Chemical Company), 0.38 kg (2.3 moles) of terephthalic acid (manufactured by Mitsui Chemicals, Inc.), 0.08 kg (0.5 mole) of isophthalic acid (manufactured by A.G International Company Inc.), 0.15 g of potassium acetate (manufactured by KISHIDA CHEMICAL Co., Ltd.) as a catalyst, and 0.50 g of magnesium acetate (manufactured by KISHIDA CHEMICAL Co., Ltd.) were charged, and pressure reduction-nitrogen injection in the polymerization reaction vessel was performed twice to perform nitrogen replacement. Then 1.07 kg (10.5 moles) of acetic anhydride was further added, the rotation rate of the stirring blade was set to 70 rpm, temperature was increased to 150° C. over 1.5 hours, and an acetylation reaction was performed in a reflux state for 2 hours.

Next, as in production example 1, a prepolymer was obtained, and then, solid phase polymerization was performed to obtain a thermotropic liquid crystal polyester (G). The melting point of the obtained thermotropic liquid crystal polyester was 360° C., Production Example 8

Production of Liquid Crystal Polyester (H)

Into a polymerization reaction vessel (manufactured by Nitto Kouatsu Co., Ltd.) using SUS316 as a material, having a double helical stirring blade, and having an internal volume of 6 L, 0.83 kg (6.0 moles) of p-hydroxybenzoic acid (manufactured by UENO FINE CHEMICALS INDUSTRY, LTD.), 0.37 kg (2.0 moles) of 4,4'-dihydroxybiphenyl (manufactured by Honshu Chemical Industry Co., Ltd.), 0.25 kg (1.5 moles) of terephthalic acid (manufactured by Mitsui Chemicals, Inc.), 0.08 kg (0.5 mole) of isophthalic acid (manufactured by A.G International Company Inc.), 0.15 g of potassium acetate (manufactured by KISHIDA CHEMICAL Co., Ltd) as a catalyst, and 0.50 g of magnesium acetate (manufactured by KISHIDA CHEMICAL Co., Ltd.) were charged, and pressure reduction-nitrogen injection in the polymerization reaction vessel was performed twice to perform nitrogen replacement. Then 1.07 kg (10.5 moles) of acetic anhydride was further added, the rotation rate of the stirring blade was set to 70 rpm, temperature was increased to 150° C. over 1.5 hours, and an acetylation reaction was performed in a reflux state for 2 hours.

Next, as in production example 1, a prepolymer was obtained, and then, solid phase polymerization was performed to obtain a thermotropic liquid crystal polyester (H). The melting point of the obtained thermotropic liquid crystal polyester was 355° C.

Production Example 9

Production of Polyester (I)

Into a polymerization reaction vessel (manufactured by Nitto Kouatsu Co., Ltd.) using SUS316 as a material, having a double helical stirring blade, and having an internal volume of 6 L, 0.28 kg (2.0 moles) of p-hydroxybenzoic acid (manufactured by UENO FINE CHEMICALS INDUSTRY, LTD.), 0.74 kg (4.0 moles) of 4,4'-dihydroxybiphenyl (manufactured by Honshu Chemical Industry Co., Ltd.), 0.17 kg (1.0 mole) of 1,4-cyclohexanedicarboxylic acid (manufactured by Eastman Chemical Company), 0.25 kg (1.5 moles) of terephthalic acid (manufactured by Mitsui Chemicals, Inc.), 0.25 kg (1.5 moles) of isophthalic acid (manufactured by A.G International Company Inc.), 0.15 g of potassium acetate (manufactured by KISHIDA CHEMICAL Co., Ltd.) as a catalyst, and 0.50 g of magnesium acetate (manufactured by KISHIDA CHEMICAL Co., Ltd.) were charged, and pressure reduction-nitrogen injection in the polymerization reaction vessel was performed twice to perform nitrogen replacement. Then 1.07 kg (10.5 moles) of acetic anhydride was further added, the rotation rate of the stirring blade was set to 70 rpm, temperature was increased to 150° C. over 1.5 hours, and an acetylation reaction was performed in a reflux state for 2 hours.

Melt polymerization was performed as in example 1 after the completion of acetylation, but the solidification of the polymer started when the temperature of the melt in the vessel reached 310° C., and therefore, the polymer was removed from an extraction port in the lower portion of the reactor, and cooled and solidified by a cooling apparatus. The obtained polymer was ground as in production example 1 to obtain a powdery polymer. When the melting point of the obtained polymer was measured, the polymer exhibited a melting point of 400° C., and when the molten state was observed with a polarization microscope, optical anisotropy could not be seen.

Production Example 10

Production of Liquid Crystal Polyester (J)

Into a polymerization reaction vessel (manufactured by Nitto Kouatsu Co., Ltd.) using SUS316 as a material, having a double helical stirring blade, and having an internal volume of 6 L, 0.41 kg (3.0 moles) of p-hydroxybenzoic acid (manufactured by UENO FINE CHEMICALS INDUSTRY, LTD.), 0.65 kg (3.5 moles) of 4,4'-dihydroxybiphenyl (manufactured by Honshu Chemical Industry Co., Ltd.), 0.60 kg (3.5 moles) of 1,4-cyclohexanedicarboxylic acid (manufactured by Eastman Chemical Company), 0.15 g of potassium acetate (manufactured by KISHIDA CHEMICAL Co., Ltd.) as a catalyst, and 0.50 g of magnesium acetate (manufactured by KISHIDA CHEMICAL Co., Ltd.) were charged, and pressure reduction-nitrogen injection in the polymerization reaction vessel was performed twice to perform nitrogen replacement. Then 1.07 kg (10.5 moles) of acetic anhydride was further added, the rotation rate of the stirring blade was set to 70 rpm, temperature was increased to 150° C. over 1.5 hours, and an acetylation reaction was performed in a reflux state for 2 hours.

Next, as in production example 1, a prepolymer was obtained, and then solid phase polymerization was performed to obtain a thermotropic liquid crystal polyester (J). The melting point of the obtained thermotropic liquid crystal polyester was 325° C.

TABLE 1

| | monomer composition (mole %) | | | | | | | melting |
| | (1) CHDA | (2) HBA | (3)-1 BP | (3)-2 DHBP | (3)-3 Bis-Ph-A | (4)-1 IPA | (4)-2 TPA | point (° C.) |
|---|---|---|---|---|---|---|---|---|
| polyester A | 20 | 60 | 20 | — | — | — | — | 345 |
| polyester B | 10 | 80 | 10 | — | — | — | — | 342 |
| polyester C | 30 | 40 | 30 | — | — | — | — | 350 |
| polyester D | 20 | 60 | 15 | 5 | — | — | — | 340 |
| polyester E | 20 | 60 | 15 | — | 5 | — | — | 338 |
| polyester F | 17 | 60 | 20 | — | — | 3 | — | 345 |
| polyester G | 2 | 40 | 30 | — | — | 5 | 23 | 360 |
| polyester H | — | 60 | 20 | — | — | 5 | 15 | 355 |
| polyester I | 10 | 20 | 40 | — | — | 15 | 15 | 400 |
| polyester J | 35 | 30 | 35 | — | — | — | — | 325 |

In Table 1, CHDA represents 1,4-cyclohexanedicarboxylic acid, HBA represents p-hydroxybenzoic acid, BP represents 4,4'-dihydroxybiphenyl, DHBP represents 4,4'-dihydroxybenzophenone, Bis-Ph-A represents 4,4'-isopropylydene diphenol, IPA represents isophthalic acid, and TPA represents terephthalic acid.

The melting point of the liquid crystal polyester was measured by the following method.
(Measurement of Melting Point)
The melting point of the liquid crystal polyester was measured by a differential scanning calorimeter (DSC) manufactured by Seiko Instruments & Electronics Ltd., using α-alumina as a reference. At this time, first, temperature was increased from room temperature to 420° C. at a temperature increase rate of 20° C./min to completely fuse the polymer, and decreased to 150° C. at a rate of 10° C./min, and then the top of an endothermic peak obtained when temperature further increased to 420° C. at a rate of 20° C./min was taken as the melting point.

The optical anisotropy of the liquid crystal polyester was confirmed by the following method.
(Confirmation of Optical Anisotropy)
A polarization microscope BH-2 (manufactured by Olympus Co., Ltd.) provided with a cooling/heating stage model 10002 for microscopes manufactured by Japan High Tech Co., Ltd. was used, a polyester sample was heated and melted on the microscope heating stage, and observed at magnifications of 100 times and 200 times during melting to confirm whether the polyester sample shows optical anisotropy.
<Titanium Oxide Particles>
A trade name "SR-1" (primary particle diameter: 0.25 μm) manufactured by Sakai Chemical Industry Co., Ltd. was provided.
<Glass Fibers>
"PX-1" (average fiber length: 3 mm, average diameter: 10 μm) manufactured by OWENS CORNING was provided.

Production of Resin Compositions

Example 1

With 100 parts by mass of the liquid crystal polyester (A) obtained above, 100 parts by mass of titanium oxide particles (SR-1, manufactured by Sakai Chemical Industry Co., Ltd.) were previously mixed, and the mixture was dried in an air oven at 150° C. for 2 hours. This dried mixture was fed to the hopper of a twin screw extruder (PCM-30, manufactured by Ikegai Tekko Kabushiki Kaisha) set the highest temperature of a cylinder to 370° C., and 22 parts by mass of glass fibers (PX-1, manufactured by OWENS CORNING) were further fed (side-fed) to the middle of the cylinder of the twin screw extruder. The mixture was melted and kneaded at an extrusion rate of 15 kg/hr to obtain pellets of a liquid crystal polyester resin composition.

Examples 2 to 5

Pellets of liquid crystal polyester resin compositions were obtained by the same equipment and operation method as in example 1 except that the liquid crystal polyesters (B) to (G) were used instead of the liquid crystal polyester (A), respectively.

Example 8

Pellets of a liquid crystal polyester resin composition were obtained by the same equipment and operation method as in example 1 except that 70 parts by mass of titanium oxide particles (SR-1, manufactured by Sakai Chemical Industry Co., Ltd.) were mixed with 100 parts by mass of the liquid crystal polyester (A).

Example 9

Pellets of a liquid crystal polyester resin composition were obtained by the same equipment and operation method as in example 1 except that 130 parts by mass of titanium oxide particles (SR-1, manufactured by Sakai Chemical Industry Co., Ltd.) were mixed with 100 parts by mass of the liquid crystal polyester (A).

Comparative Example 1

Pellets of a liquid crystal polyester resin composition were obtained by the same equipment and operation method as in example 1 except that 40 parts by mass of titanium oxide particles (SR-1, manufactured by Sakai Chemical Industry Co., Ltd.) were mixed with 100 parts by mass of the liquid crystal polyester (A).

Comparative Example 5

An attempt was made to produce pellets of a liquid crystal polyester resin composition by the same equipment and operation method as in example 1 except that 160 parts by mass of titanium oxide particles (SR-1, manufactured by Sakai Chemical Industry Co., Ltd.) were mixed with 100 parts by mass of the liquid crystal polyester (A), but pellets could not be obtained,

TABLE 2

| | polyester | titanium oxide particles (parts by mass) | glass fiber (parts by mass) | initial light reflectance, %, 480 nm | light reflectance after light irradiation test, %, 480 nm | distortion temperature under load DTUL (° C.) | flexural modulus (GPa) | complete melting temperature (° C.) |
|---|---|---|---|---|---|---|---|---|
| Example 1 | A | 100 | 100 | 22 | 86 | 86 | 245 | 7.1 | 350 |
| Example 2 | B | 100 | 100 | 22 | 87 | 84 | 240 | 8.5 | 345 |
| Example 3 | C | 100 | 100 | 22 | 83 | 83 | 235 | 6.8 | 355 |
| Example 4 | D | 100 | 100 | 22 | 85 | 85 | 230 | 7.5 | 345 |
| Example 5 | E | 100 | 100 | 22 | 84 | 83 | 225 | 7.2 | 345 |
| Example 6 | F | 100 | 100 | 22 | 86 | 85 | 250 | 9.5 | 345 |
| Example 7 | G | 100 | 100 | 22 | 86 | 76 | 245 | 10.2 | 360 |
| Example 8 | A | 100 | 70 | 22 | 81 | 81 | 244 | 9.3 | 350 |
| Example 9 | A | 100 | 130 | 22 | 88 | 88 | 240 | 5.8 | 350 |
| Comparative Example 1 | H | 100 | 100 | 22 | 86 | 69 | 266 | 9.5 | 350 |
| Comparative Example 2 | I | 100 | 100 | 22 | 64 | 60 | 180 | 4.0 | 410 |
| Comparative Example 3 | J | 100 | 100 | 22 | 70 | 69 | 195 | 7.0 | 330 |
| Comparative Example 4 | A | 100 | 40 | 22 | 74 | 72 | 247 | 8.0 | 350 |
| Comparative Example 5 | A | 100 | 160 | 22 | — | — | — | — | — |

Example 1 except that the liquid crystal polyester (H) was used instead of the liquid crystal polyester (A).

Comparative Example 2

An attempt was made to produce pellets of a liquid crystal polyester resin composition by the same equipment and operation method as in example 1 except that the polyester (I) was used instead of the liquid crystal polyester (A), but the polyester (I) did not melt, and therefore, the highest temperature of a cylinder was set to 420° C. to obtain resin composition pellets. Since a processing temperature was high, the pellets were colored into light brown.

Comparative Example 3

Pellets of a liquid crystal polyester resin composition were obtained by the same equipment and operation method as in example 1 except that the liquid crystal polyester (J) was used instead of the liquid crystal polyester (A).

Comparative Example 4

Pellets of a liquid crystal polyester resin composition were obtained by the same equipment and operation method as in <Fabrication of Test Pieces by Injection Molding Method>

The pellets of the resin compositions obtained in the above examples and comparative examples were injection-molded at a cylinder highest temperature of 350° C., an injection rate of 100 mm/sec, and a mold temperature of 80° C., using an injection molding machine (SG-25, manufactured by Sumitomo Heavy Industries, Ltd.), to fabricate 13 mm (width)×130 mm (length)×3.0 mm (thickness) injection-molded bodies. These were used as test pieces for the measurement of light reflectance. Injection molding was performed under the same conditions as the above to fabricate flexural test pieces according to ASTM D790, and these flexural test pieces were used as test pieces for the measurement of a distortion temperature under load (DTUL) and a flexural modulus.

For the test pieces obtained above, initial light reflectance, light reflectance after a light irradiation test, and a distortion temperature under load were measured by the following methods. Results are shown in Table 2.

(Measurement of Initial Light Reflectance)

For the surfaces of the obtained test pieces for light reflectance measurement, the measurement of diffuse reflectance for light having a wavelength of 480 nm was performed using a self-recording spectrophotometer (U-3500: manufactured by Hitachi, Ltd.). Light reflectance is a relative value when the diffuse reflectance of a barium sulfate standard white plate is taken as 100%.

(Measurement of Light Reflectance after Light Irradiation Test)

A light irradiation test, in which 500 hour light irradiation was performed by a xenon lamp with the setting of 600 W/m² and a BPT temperature of 90° C. using SUNTEST XLS+ manufactured by Toyo Seiki Seisaku-sho, Ltd., was performed on the obtained test pieces for light reflectance measurement. For the surfaces of the test pieces after this light irradiation test, the measurement of diffuse reflectance for light having a wavelength of 480 nm was performed using a self-recording spectrophotometer (U-3500: manufactured by Hitachi, Ltd.). Light reflectance is a relative value when the diffuse reflectance of a barium sulfate standard white plate is taken as 100%.

(Measurement of Distortion Temperature under Load)

Using the test pieces for flexural tests fabricated above, the measurement of a distortion temperature under load (DTUL) was performed according to ASTM D648.

(Measurement of Flexural Modulus)

Using the test pieces for flexural tests fabricated above, the measurement of a flexural modulus was performed according to ASTM D790.

(Measurement of Complete Melting Temperature)

By a capillary rheometer (model 2010) manufactured by INTESCO Co., Ltd. and using one having a capillary diameter of 1.0 mm, a length of 40 mm, and an inflow angle of 90°, the measurement of apparent viscosity was performed at a shear rate of 100 sec⁻¹ while constant rate heating was performed at a temperature increase rate of +4° C./min from the melting point–30° C. to the melting point +20° C., and an apparent viscosity-temperature curve was obtained. Temperature corresponding to the intersection point of an approximate straight line in a region in which a change in apparent viscosity with respect to temperature was sudden and an approximate straight line in a region in which a change in apparent viscosity with respect to temperature was gradual in the obtained curve was taken as complete melting temperature.

All of the resin compositions of examples 1 to 9 obtained by using the liquid crystal polyesters (A) to (G) obtained from the raw materials in which the content of 1,4-cyclohexanedicarboxylic acid (CHDA) forming the structural unit of the formula (1) was 2 to 30 mole % and the content of p-hydroxybenzoic acid (HBA) forming the structural unit of the formula (2) was in the range of 40 to 80 mole % were capable of being injection-molded at 380° C. or less. As shown in Table 2, all of the initial light reflectance of the obtained molded articles for 480 nm light was as high as 80% or more, and the light reflectance after the 500 hour light irradiation test decreased only by about 10% with respect to the initial light reflectance and maintained a high level of 75% or more. No discoloration of the molded body surfaces was seen. Further, it was confirmed that all of the injection-molded bodies obtained from the resin compositions of examples 1 to 9 had a distortion temperature under load (DTUL) of more than 220° C. and a flexural modulus as high as 6 GPa or more, having a high degree of heat resistance and mechanical properties.

On the other hand, in the resin composition of comparative example 1 obtained by using the polyester H which did not contain the structural unit derived from CHDA, the initial light reflectance was 80% or more, but the light reflectance after 500 hour light irradiation decreased by about 20% from the initial light reflectance and was less than 70%. The polyester (I) having the content of the structural unit derived from HBA of 20 mole %, which was less than the range of the present invention, did not exhibit liquid crystallinity, and required excessive heating in molding processing, and therefore, the resin composition was colored, and the initial reflectance was as low as 64%. The DTUL was less than 200° C., the flexural modulus was about 4 GPa, and both the heat resistance and the mechanical properties were inferior. Further, the polyester (J) having the content of the structural unit derived from CHDA of 35 mole % and the content of the structural unit derived from HBA of 30 mole %, which departed from the range of the present invention, had liquid crystallinity, but the DTUL was less than 200° C., and the heat resistance was inferior. In the resin composition of comparative example 4 in which the amount of the titanium oxide to be blended was less than the lower limit of the range of the present invention, the light reflectance was insufficient, and in comparative example 5 in which the amount of the titanium oxide to be blended was more than the upper limit of the range of the present invention, a resin composition could not be obtained.

INDUSTRIAL APPLICABILITY

According to the present invention, it is possible to provide a liquid crystal polyester resin composition capable of producing a molded body which has sufficient light reflectance and in which discoloration due to light is little and light reflectance is less likely to decrease, and the molded body and an LED reflector thereof.

The invention claimed is:

1. A liquid crystal polyester resin composition consisting essentially of:
   100 parts by mass of a liquid crystal polyester; and
   50 to 150 parts by mass of titanium oxide,
   wherein the liquid crystal polyester comprises 2 to 30 mole % of a repeating structural unit represented by the following formula (1), and 40 to 80 mole % of a repeating structural unit represented by the following formula (2)

[Chemical Formula 1]

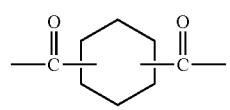
(1)

[Chemical Formula 2]

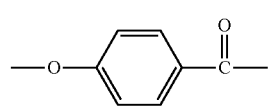
(2)

and wherein the liquid crystal polyester compostion maintains at 480 nm wave light reflectance of a surface of a 3 mm thickness obtained by injection molding after 500 hours light irradiation a light reflectance of 75% or more.

2. The liquid crystal polyester resin composition according to claim 1, wherein the liquid crystal polyester comprises 10 to 30 mole % of the repeating structural unit represented by the formula (1), 40 to 80 mole % of the repeating structural unit represented by the formula (2), and 10 to 30 mole % of a repeating structural unit represented by the following formula (3):

[Chemical Formula 3]

—O—X—O— (3)

wherein X represents a divalent group having an aromatic ring.

3. The liquid crystal polyester resin composition according to claim 1, wherein the liquid crystal polyester comprises 2 to 29 mole % of the repeating structural unit represented by the formula (1), 40 to 80 mole % of the repeating structural unit represented by the formula (2), 10 to 30 mole % of a repeating structural unit represented by the following formula (3), and 1 to 28 mole % of a repeating structural unit represented by the following formula (4), and the liquid crystal polyester comprises 1 mole % or more of a repeating structural unit represented by the following formula (5) as the repeating structural unit represented by the formula (4):

[Chemical Formula 4]

—O—X—O— (3)

wherein X represents a divalent group having an aromatic ring;

[Chemical Formula 5]

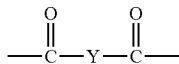
(4)

wherein Y represents a divalent group having an aromatic ring; and

[Chemical Formula 6]

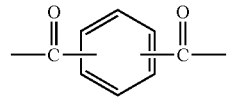
(5)

wherein two bonds of an aromatic ring are in a meta or para relationship.

4. The liquid crystal polyester resin composition according to claim 1, wherein the liquid crystal polyester is obtained by two-stage polymerization of melt polycondensation and solid phase polycondensation.

5. The liquid crystal polyester resin composition according to claim 1, wherein a melting point of the liquid crystal polyester is 300° C. or more and 380° C. or less.

6. A molded body comprising the liquid crystal polyester resin composition according to claim 1.

7. An LED reflector comprising the liquid crystal polyester resin composition according to claim 1.

* * * * *

UNITED STATES PATENT AND TRADEMARK OFFICE
CERTIFICATE OF CORRECTION

PATENT NO. : 8,992,805 B2
APPLICATION NO. : 14/111004
DATED : March 31, 2015
INVENTOR(S) : K. Nishimura et al.

It is certified that error appears in the above-identified patent and that said Letters Patent is hereby corrected as shown below:

In the Claims

Column 24, line 57 (claim 1, line 13) please change "polyester compostion" to -- polyester composition --.

Signed and Sealed this
Eighteenth Day of August, 2015

Michelle K. Lee
*Director of the United States Patent and Trademark Office*